US009680959B2

(12) United States Patent
Gargi et al.

(10) Patent No.: US 9,680,959 B2
(45) Date of Patent: Jun. 13, 2017

(54) RECOMMENDING CONTENT BASED ON INTERSECTING USER INTEREST PROFILES

(75) Inventors: Ullas Gargi, Sunnyvale, CA (US); Nisarg Dilipkumar Kothari, Sunnyvale, CA (US); Nicholas Delmonico Rizzolo, Cupertino, CA (US)

(73) Assignee: Google Inc., Mountain View, CA (US)

( * ) Notice: Subject to any disclaimer, the term of this patent is extended or adjusted under 35 U.S.C. 154(b) by 82 days.

(21) Appl. No.: 13/599,136

(22) Filed: Aug. 30, 2012

(65) Prior Publication Data

US 2016/0255170 A1    Sep. 1, 2016

(51) Int. Cl.
H04L 29/08    (2006.01)
G06F 17/30    (2006.01)
G06Q 30/02    (2012.01)

(52) U.S. Cl.
CPC ...... *H04L 67/306* (2013.01); *G06F 17/30867* (2013.01); *G06Q 30/0269* (2013.01)

(58) Field of Classification Search
USPC ......... 709/204–205; 705/14.53, 26.7; 725/46
See application file for complete search history.

(56) References Cited

U.S. PATENT DOCUMENTS

| | | |
|---|---|---|
| 6,130,938 A | 10/2000 | Erb |
| 6,192,119 B1 | 2/2001 | Wilson |
| 6,697,478 B1 | 2/2004 | Meldrum et al. |
| 6,754,322 B1 | 6/2004 | Bushnell |
| 7,106,848 B1 | 9/2006 | Barlow et al. |
| 7,366,990 B2 | 4/2008 | Pitroda |
| 7,555,110 B2 | 6/2009 | Dolan et al. |

(Continued)

FOREIGN PATENT DOCUMENTS

WO    WO02079984    10/2002

OTHER PUBLICATIONS

Adamic et al., "A Social Network Caught in the Web," Internet Journal, First Monday, Jun. 2, 2003, vol. 8, No. 6, pp. 1-22.

(Continued)

*Primary Examiner* — Abdullahi E Salad
(74) *Attorney, Agent, or Firm* — Patent Law Works LLP

(57) ABSTRACT

This technology may generate recommendations of relevant content, based on determining intersections among one or more user interest profiles of users, who interact either synchronously or asynchronously. This technology may retrieve interest profiles for particular users, determine intersections among all user interest profiles (or among individual content recommendations), and create a group interest profile, update the particular users' interest profiles based on the group interest profile created, and generate recommendations of content that is determined to be relevant based on the group interest profile. A user may select items from these recommendations of content, add the user-selected content recommendations to a common group pool, generate a group interest profile based on the common group pool, and generate recommendations of content based on the group interest profile. Scores for the recommendations of content may be calculated and the top scoring ones may be displayed to the users in the group.

30 Claims, 10 Drawing Sheets

(56) References Cited

U.S. PATENT DOCUMENTS

| | | | |
|---|---|---|---|
| 7,610,287 B1 | 10/2009 | Dean et al. | |
| 7,742,468 B2 | 6/2010 | Vagelos | |
| 2002/0137490 A1 | 9/2002 | Gallant | |
| 2002/0143874 A1 | 10/2002 | Marquette et al. | |
| 2004/0258220 A1 | 12/2004 | Levine et al. | |
| 2005/0152521 A1 | 7/2005 | Liljestrand | |
| 2006/0026288 A1 | 2/2006 | Acharya et al. | |
| 2006/0077957 A1 | 4/2006 | Reddy et al. | |
| 2006/0206604 A1 | 9/2006 | O'Neil et al. | |
| 2007/0028266 A1* | 2/2007 | Trajkovic et al. | 725/46 |
| 2007/0127631 A1 | 6/2007 | Difiglia | |
| 2007/0169148 A1* | 7/2007 | Oddo et al. | 725/46 |
| 2007/0171898 A1 | 7/2007 | Salva | |
| 2007/0173236 A1 | 7/2007 | Vishwanathan et al. | |
| 2007/0248077 A1 | 10/2007 | Mahle, Jr. et al. | |
| 2008/0028427 A1* | 1/2008 | Nesvadba et al. | 725/46 |
| 2008/0056475 A1 | 3/2008 | Brannick et al. | |
| 2008/0192656 A1 | 8/2008 | Vagelos | |
| 2009/0055377 A1* | 2/2009 | Hedge et al. | 707/5 |
| 2009/0216563 A1* | 8/2009 | Sandoval et al. | 705/3 |
| 2011/0098156 A1 | 4/2011 | Ng et al. | |
| 2012/0089437 A1* | 4/2012 | Amento | G06Q 30/02 705/7.29 |
| 2012/0095863 A1* | 4/2012 | Schiff | G06Q 30/0631 705/26.7 |
| 2012/0180107 A1* | 7/2012 | Gammill | G06Q 30/02 726/3 |
| 2012/0190386 A1* | 7/2012 | Anderson | G01C 15/04 455/456.3 |
| 2012/0324492 A1* | 12/2012 | Treadwell et al. | 725/10 |
| 2013/0006765 A1* | 1/2013 | Lee | 705/14.53 |
| 2013/0185657 A1* | 7/2013 | Gunawardena | G06F 17/30038 715/753 |
| 2013/0191394 A1* | 7/2013 | Bradley et al. | 707/738 |
| 2013/0325655 A1* | 12/2013 | Wouhaybi | G06Q 30/0631 705/26.7 |
| 2014/0040370 A1* | 2/2014 | Buhr | 709/204 |

OTHER PUBLICATIONS

Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.

Anwar et al., "Leveraging 'Social-Network' Infrastructure to Improve Peer-to Peer Overlay Performance: Results from Orkut," University of Illinois at Urbana-Champaign USA, 2005, 9 pgs.

AT&T Personal Reach Service: Benefits and Features, Mar. 29, 2010, 7 pgs.

AT&T Personal Reach Service: Personal Reach Service, Mar. 29, 2010, 2 pgs.

Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.

Boyd, et al., "Social Network Sites: Definition, History, and Scholarship," Journal of Computer-Mediated Communication, International Communication Association, 2008, pp. 210-230.

Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.

Decker et al., "The Social Semantic Desktop," Digital Enterprise Research Institute, DERI Galway, Ireland, DERI Innsbruck, Austria, DERI Technical Report, May 2, 2004, 7 pgs.

Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.

Eagle et al., "Social Serendipity: Proximity Sensing and Cueing," MIT Media Laboratory Technical Note 580, May 2004, 18 pgs.

Erickson et al., "Social Translucence: Using Minimalist Visualizations of Social Activity to Support Collective Interaction," Designing Information Spaces: The Social Navigation Approach, Springer-verlag: London, 2003, pp. 1-19.

Gross et al., "Information Revelation and Privacy in Online Social Networks," WPES '05, Alexandria, Virginia, Nov. 7, 2005, pp. 71-80.

Hammond et al., "Social Bookmarking Tools (I)," D-Lib Magazine, Apr. 2005, vol. II, No. 4, ISSN 1082-9873, 23 pgs.

Heer et al., "Vizster: Visualizing Online Social Networks," University of California, Berkeley, Oct. 23, 2005, 8 pgs.

International Search Report, International Application No. PCT/US2008/005118, Sep. 30, 2008, 2 pgs.

Leonard, "You Are Who You Know," Internet, retrieved at http://www.salon.com, Jun. 15, 2004, 15 pgs.

LiveJournal, "FAQ #163: How Do I Find a Syndicated Account?" Last Updated: thebubba, Jan. 6, 2004, 2 pgs.

Marwick, "Selling Your Self: Online Identity in the Age of a Commodified Internet," University of Washington, 2005, 192 pgs.

MediaSift Ltd., DataSift: Realtime Social Data Mining Platform, Curate and Data Mine the Real Time Web with DataSift, Dedipower, Managed Hosting, [Retrieved on May 13, 2011], 1 pg.

Metcalf et al., "Spatial Dynamics of Social Network Evolution," 23rd International Conference of the System Dynamics Society, Jul. 19, 2005, pp. 1-13.

Mori et al., "Real-world Oriented Information Sharing Using Social Networks," Group '05, Sanibel Island, Florida, USA, Nov. 6-9, 2005, pp. 81-84.

Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.

Neumann et al., "Semantic social network portal for collaborative online communities," Journal of European Industrial Training, 2005, Emerald Group Publishing, Limited, vol. 29, No. 6, pp. 472-487.

O'Murchu et al., "Online Social and Business Networking Communities," Digital Enterprise Research Institute DERI Technical Report, National University of Ireland, Aug. 11, 2004, 22 pgs.

Ring Central, Inc., Internet, retrieved at http://www.ringcentral.com, Apr. 19, 2007, 1 pg.

Singh et al., "Cinema: Columbia InterNet Extensible Multimedia Architecture," Department of Computer Science, Columbia University, May 2002, pp. 1-83.

Steen et al., "Development of we-centric, context-aware, adaptive mobile services requires empathy and dialogue," Freeband FRUX, Oct. 17, 2005, Internet Journal, Netherlands, pp. 1-4.

Superfeedr Track, Internet, retrieved at http://blog.superfeedr.com/track/filter/xmpp/pubsubhubbub/track, May 13, 2011, 8 pgs.

Twitter Blog: Tracking Twitter, Internet, retrieved at http://blog.twitter.com/2007/09/tracking-twitter.html, May 13, 2011, 2 pgs.

Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.

Van Eijk et al., "We-centric, context-aware, adaptive mobile service bundles," Freeband, Telematica Instituut, TNO telecom, Nov. 30, 2004, 48 pgs.

Wenger et al., "Technology for Communities," CEFRIO Book Chapter v 5.2, Jan. 18, 2005, pp. 1-15.

\* cited by examiner

RECOMMENDING CONTENT BASED ON INTERSECTING USER INTEREST PROFILES

BACKGROUND

The present disclosure relates to technology for recommending content based on user interest profiles. In particular, the present disclosure relates to technology for recommending content to users of an online community, based on determining one or more intersections (e.g., similarities in interest) among user interest profiles.

Online communities, for example, social networks, are becoming increasingly popular, providing users of the online communities with a virtual forum where they may interact and share space and content or otherwise communicate as desired. Users may share their views, interests, and activities via these online communities. They may participate in a virtual forum, either synchronously, in groups, to communicate in real-time (for example, to "video chat") or to share activities (for example, to view video content), or otherwise interact with one another asynchronously in "chat" forums.

SUMMARY

In one innovative aspect, the present disclosure of the technology includes systems including a processor and a memory storing instructions that, when executed, cause the system to retrieve one or more user interest profiles, determine an intersection between the one or more user interest profiles, generate a group interest profile; and generate the content recommendations based on the group interest profile that is generated.

In general, another innovative aspect of the present disclosure includes a method, using one or more computing devices, for retrieving one or more user interest profiles; determining at least one intersection between the one or more user interest profiles; generating, a group interest profile; and generating recommendations of content based on the group interest profile.

Other implementations of one or more of these aspects include corresponding systems, apparatus, and computer programs, configured to perform the action of the methods, encoded on computer storage devices.

These and other implementations may each optionally include one or more of the following features.

i. For instance, the operations further include one or more of: 1) updating users' interest profiles based on the group interest profile; 2) generating content recommendations based on the group interest profile; 3) providing for display a prompt for users to select items from their content recommendations; 4) adding the user-selected content recommendations to a common group pool; 5) providing for display the content recommendations to the users of the group; 6) calculating scores for content recommendations; and 7) providing for display the top scoring content recommendations to the users in the group.

ii. For instance, the features include: a) each user interest profile corresponding to a user; 2) the group interest profile is based on the intersection between the one or more user interest profiles; 3) a user interface configured to provide for display a prompt for a user to select one or more user-selected content recommendations; 4) a selection prompt module for adding the one or more user-selected content recommendations to a common group pool; 5) a user interface configured to provide for display the one or more user-selected content recommendations to one or more users; 6) a scoring module for calculating scores for the content recommendations based on whether the content recommendations are relevant; and 7) a user interface configured to provide for display top scoring content recommendations to one or more users.

The systems and methods disclosed below are advantageous in a number of respects. With the ongoing trends and growth in social network communication, it may be beneficial to generate "common" user interest profiles from a group activity (users interacting either synchronously or asynchronously) and recommend content based on determining one or more intersecting user interest profiles. The systems and methods provide ways for suggesting content to a group interacting either synchronously or asynchronously as a whole. They provide ways to generate group interest profiles that define common interests for the group. They also provide ways by which the group interest profiles are compared to a universe of content to search for content that is suitable for a particular group, based on which recommendations of content are generated. They provide a user interface to allow individual users to indicate selections of particular content recommendations.

BRIEF DESCRIPTION OF THE DRAWINGS

The present disclosure is illustrated by way of example, and not by way of limitation, in the figures of the accompanying drawings, in which like reference numerals are used to refer to similar elements.

DETAILED DESCRIPTION

Figure 1:
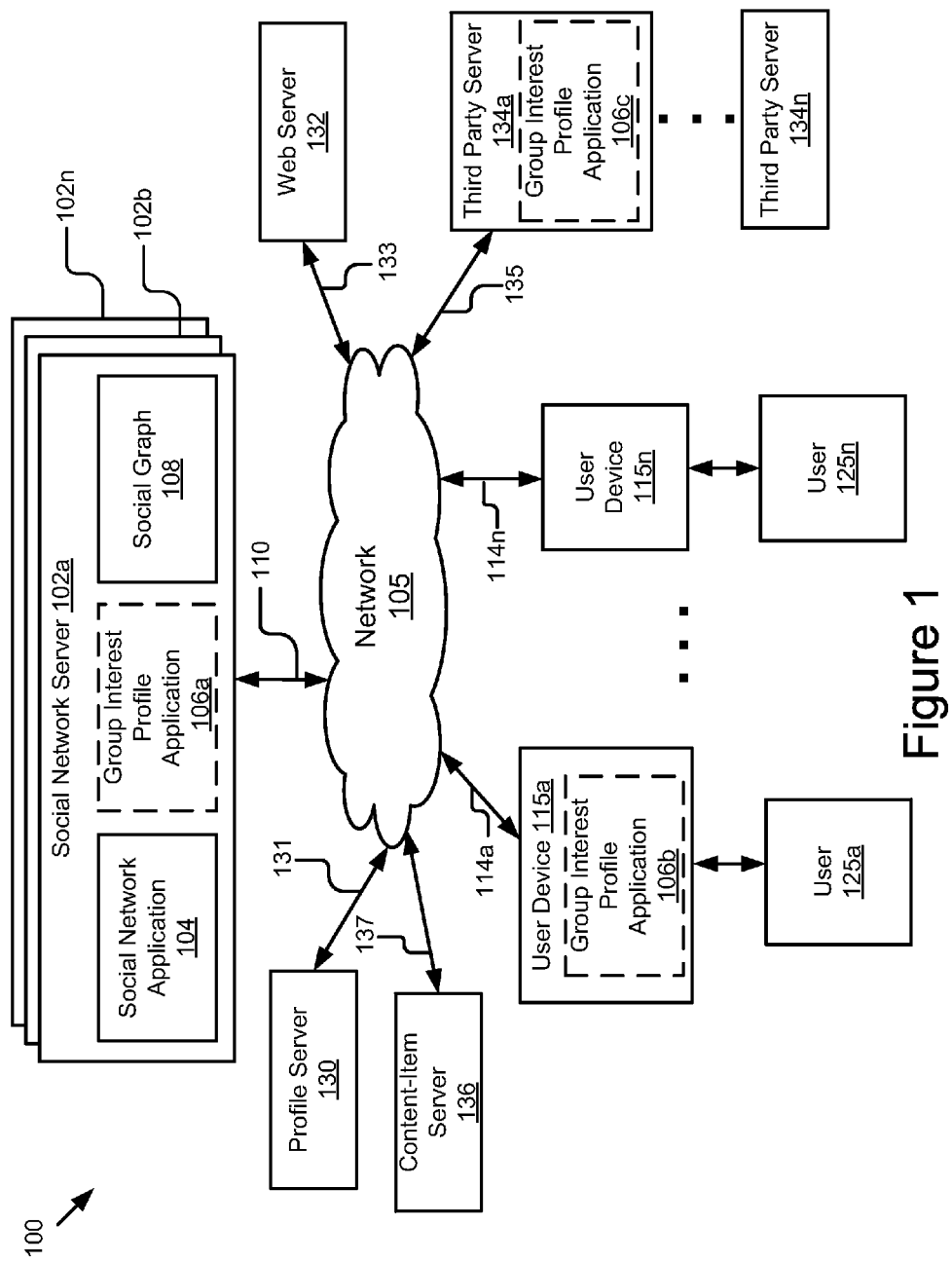
FIG. 1 is a high-level block diagram illustrating an example system for generating recommendations of content based at least in part on a group interest profile including a group interest profile application.

In some implementations, this technology includes systems and methods for generating recommendations of content for users, by determining intersecting user interest profiles. Specifically, this technology receives one or more user interest profiles from one or more users communicating synchronously or asynchronously (e.g., audio chat, video chat, instant messaging, etc.), and generates a group interest profile, based on determining one or more "intersecting" (e.g., with similarities) user interest profiles. In some instances, each user interest profile corresponds to a particular user and his or her individual or personal interests. The systems and methods of this technology determine the intersections between the one or more user interest profiles, and generate recommendations of appropriate or relevant content based on the intersecting user interest profiles. In some implementations, the systems and methods require users to manually select recommendations and generate recommendations of content based on user-selected recommendations. In some instances, the systems and methods generate one or more recommendations of content for one or more users, calculate scores for the one or more recommendations of content based on whether they are relevant to particular user interest profiles, and provide for display the top scoring recommendations of content to one or more members of a group of users.

In the following description, for purposes of explanation, numerous specific details are indicated in order to provide a thorough understanding of the technology described. This technology may be practiced without these specific details. In the instances illustrated, structures and devices are shown in block diagram form in order to avoid obscuring the technology. For example, the present technology is described with some implementations illustrated below with reference to user interfaces and particular hardware. However, the present technology applies to any type of computing device that can receive data and commands, and any devices providing services. Moreover, the present technology is described below primarily in the context of generating and providing recommendations of content, by determining intersecting user interest profiles; however, the present technology applies to any type of situation and may be used for other applications beyond generating and providing content. In particular, this technology may be used in other contexts besides providing recommendations of content.

Reference in the specification to "one implementation," "an implementation," or "some implementations" means simply that one or more particular features, structures, or characteristics described in connection with the one or more implementations is included in at least one or more implementations that are described. The appearances of the phrase "in one implementation or instance" in various places in the specification are not necessarily all referring to the same implementation or instance.

Some portions of the detailed descriptions that follow are presented in terms of algorithms and symbolic representations of operations on data bits within a computer memory of either one or more computing devices. These algorithmic descriptions and representations are the means used to most effectively convey the substance of the technology. An algorithm as indicated here, and generally, is conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the following discussion, it should be appreciated that throughout the description, discussions utilizing terms, for example, "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present technology also relates to an apparatus for performing the operations described here. This apparatus may be specially constructed for the required purposes, or it may include a general-purpose computer selectively activated or reconfigured by a computer program stored in the computer. For example, a computer program may be stored in a computer-readable storage medium, for example, but not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

This technology may take the form of an entirely hardware implementation, an entirely software implementation, or an implementation including both hardware and software components. In some instances, this technology is implemented in software, which includes but is not limited to firmware, resident software, microcode, etc.

Furthermore, this technology may take the form of a computer program product accessible from a computer-usable or computer-readable medium providing program code for use by or in connection with a computer or any instruction execution system. For the purposes of this description, a computer-usable or computer-readable medium may be any apparatus that can include, store, communicate, propagate, or transport the program for use by or in connection with the instruction execution system, apparatus, or device.

A data processing system suitable for storing and/or executing program code includes at least one processor coupled directly or indirectly to memory elements through a system bus. The memory elements may include local memory employed during actual execution of the program code, bulk storage, and cache memories, which provide temporary storage of at least some program code in order to reduce the number of times code may be retrieved from bulk storage during execution.

Input/output or I/O devices (including but not limited to keyboards, displays, pointing devices, etc.) may be coupled to the system either directly or through intervening I/O controllers.

Communication units including network adapters may also be coupled to the systems to enable them to couple to other data processing systems, remote printers, or storage devices, through either intervening private or public networks. Modems, cable modems, and Ethernet cards are just a few examples of the currently available types of network adapters.

Finally, the algorithms and displays presented in this application are not inherently related to any particular computer or other apparatus. Various general-purpose systems may be used with programs in accordance with the teachings here, or it may prove convenient to construct more specialized apparatus to perform the required method steps. The required structure for a variety of these systems is outlined in the description below. In addition, the present technology is not described with reference to any particular programming language. It should be understood that a variety of programming languages may be used to implement the technology as described here.

FIG. 1 is a high-level block diagram illustrating some implementations of systems for generating recommendations of content based on generating a group interest profile. The system 100 illustrated in FIG. 1 includes system architecture (distributed or other) for generating recommendations of content based on a group interest profile. The system 100 includes one or more social network servers 102a, 102b, through 102n, that may be accessed via user devices 115a through 115n, which are used by users 125a through 125n, to connect to any one of the social network servers 102a, 102b, through 102n. These entities are communicatively coupled via a network 105. Although only two user devices 115a through 115n are illustrated, any numbers of user devices 115n may be used by any number of users 125n.

Moreover, while the present disclosure is described below primarily in the context of providing a framework for providing recommendations of content by generating a group interest profile, the present disclosure may be applicable to other situations where generating recommendations of content for any purpose that is not related to a group interest profile, may be desired. For ease of understanding and brevity, the present disclosure is described in reference to generating recommendations of content based on creating a group interest profile.

The user devices 115a through 115n in FIG. 1 are illustrated simply as one example. Although FIG. 1 illustrates only two devices, the present disclosure applies to any system architecture having one or more user devices 115, therefore, any number of user devices 115n may be used. Furthermore, while only one network 105 is illustrated as coupled to the user devices 115a through 115n, the social network servers, 102a-102n, the profile server 130, the web server 132, third party servers 134a through 134n, and the content-item server 136, in practice, any number of networks 105 may be connected to these entities. In addition, although only two third party servers 134a through 134n are shown, the system 100 may include any number of third party servers 134n.

In some implementations, the social network server 102a is coupled to the network 105 via a signal line 110. The social network server 102a includes a social network application 104, which includes the software routines and instructions to operate the social network server 102a and its functions and operations. Although only one social network server 102a is described here, multiple servers may be present, as illustrated by social network servers 102b through 102n, each with functionality similar to social network server 102a or different.

The term "social network" as used here includes, but is not limited to, any type of social structure where the users are connected by a common feature or link. The common feature includes relationships/connections, e.g., friendship, family, work, a similar interest, etc. The common features are provided by one or more social networking systems, such as those included in the system 100, including explicitly-defined relationships and relationships implied by social connections with other online users, where the relationships form the social graph 108.

The term "social graph" as used here includes, but is not limited to, a set of online relationships between users, such as provided by one or more social networking systems, such as the social network system 100, including explicitly-defined relationships and relationships implied by social connections with other online users, where the relationships form a social graph 108. In some examples, the social graph 108 may reflect a mapping of these users and how they are related to one another.

The social network server 102a and the social network software/application 104 as illustrated are representative of a single social network. Each of the plurality of social network servers 102a, 102b through 102n, may be coupled to the network 105, each having its own server, application, and social graph. For example, a first social network hosted on a social network server 102a may be directed to business networking, a second on a social network server 102b directed to or centered on academics, a third on a social network server 102c (not separately shown) directed to local business, a fourth on a social network server 102d (not separately shown) directed to dating, and yet others on social network server (102n) directed to other general interests or perhaps a specific focus.

A profile server 130 is illustrated as a stand-alone server in FIG. 1. In other implementations of the system 100, all or part of the profile server 130 may be part of the social network server 102a. The profile server 130 is connected to the network 105 via a line 131. The profile server 130 has profiles for all the users that belong to a particular social network 102a-102n. One or more third party servers 134a through 134n are connected to the network 105, via signal line 135. A web server 132 is connected, via line 133, to the network 105.

The content-item server 136 is illustrated as a stand-alone server in FIG. 1. In some implementations, the content-item server 136 delivers items that are recommended as well as metadata relating to those items. The content-item server 136 provides the items recommended for display to users.

The social network server 102a includes a group interest profile application 106a, to which user devices 115a through 115n are coupled via the network 105. In particular, user device 115a is coupled, via line 114a, to the network 105. For example, the user 125a may use the user device 115a to access the group interest profile application 106a to view recommendations of content for personal or group use. The group interest profile application 106 or certain components of it may be stored in a distributed architecture in any of the social network server 102, the third party server 134, and the user device 115. In some implementations, the group interest profile application 106 may be included, either partially or entirely, in any one or more of the social network server 102, the third party server 134, and the user device 115.

The user devices 115a through 115n may be a computing device, for example, a laptop computer, a desktop computer, a tablet computer, a mobile telephone, a personal digital assistant (PDA), a mobile email device, a portable game player, a portable music player, a television with one or more processors embedded in the television or coupled to it, or any other electronic device capable of accessing a network.

The network 105 may be of conventional type, wired or wireless, and may have any number of configurations such as a star configuration, token ring configuration, or other configurations known to those skilled in the art. Furthermore, the network 105 may comprise a local area network (LAN), a wide area network (WAN, e.g., the Internet), and/or any other interconnected data path across which one or more devices may communicate.

In some implementations, the network 105 may be a peer-to-peer network. The network 105 may also be coupled to or include portions of one or more telecommunications networks for sending data in a variety of different communication protocols.

In some instances, the network 105 includes Bluetooth communication networks or a cellular communications network for sending and receiving data such as via short messaging service (SMS), multimedia messaging service (MMS), hypertext transfer protocol (HTTP), direct data connection, WAP, email, etc.

In some implementations, the social network servers, 102a-102n, the profile server 130, the web server 132, and the third party servers 134a through 134n are hardware servers including a processor, memory, and network communication capabilities. One or more of the users 125a through 125n access any of the social network servers 102a through 102n, via browsers in their user devices and via the web server 132.

As one example, in some implementations of the system, the interest profiles of particular users (125a through 125n) of a social network 102a through 102n may be retrieved from the social graph 108. In addition, information to generate one or more of the users' individual recommendations of content is retrieved. It should be noted that any information that is retrieved for particular users is only upon obtaining the necessary permissions from the users, in order to protect user privacy and any sensitive information of the users. The group interest profile application 106a generates recommendations of content for group members.

Figure 2:
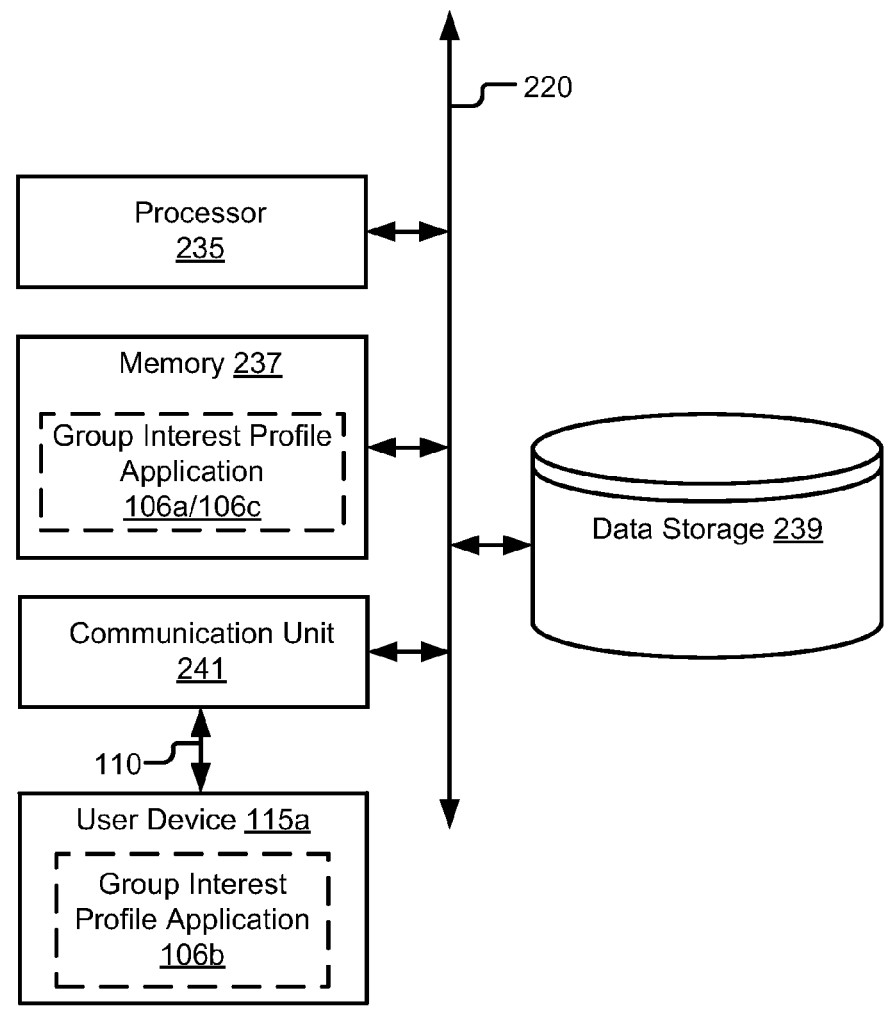
FIG. 2 is a block diagram illustrating example hardware components in the example system shown in FIG. 1.

FIG. 2 is a block diagram illustrating some implementations of a social network server 102a through 102n and third party server 134a through 134n, system 200 including a group interest profile application 106a/106c. In FIG. 2, like reference numerals have been used to reference like components with the same or similar functionality that has been described above with reference to FIG. 1. Since those components have been described above that description is not repeated here. The system 200 generally includes one or more processors, although only one processor 235 is illustrated in FIG. 2. The processor is coupled, via a bus 220, to memory 237 and data storage 239, which stores any information related to content recommendations and/or interest profiles, received from any of the other sources identified above. In some instances, the data storage 239 is a database organized by a user or a group of users. In some instances, the group interest profile application is stored in the memory 237.

A user 125a, via a user device 115a, may view the recommendations of content and/or may add recommendations of content to an "interest" profile, via the communication unit 241. The group interest profile applications 106a and 106c may reside, in their entirety or parts of them, in the user's device (115a through 115n), in the social network server 102a (through 102n), or, in a separate server, for example, in the third party server 134 (FIG. 1). The user device 115a communicates with the social network server 102a using the communication unit 241, via signal line 110.

Figure 3:
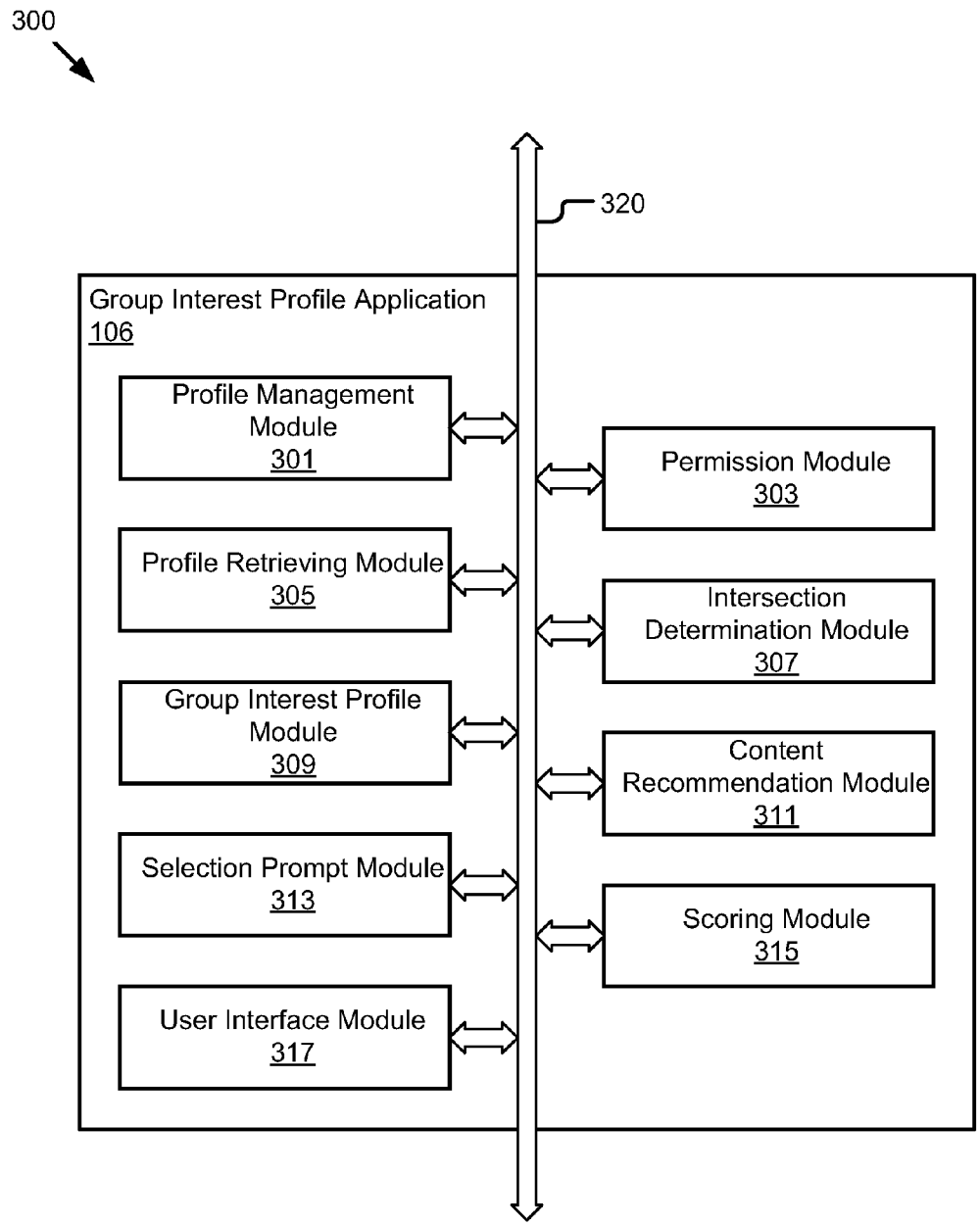
FIG. 3 is a block diagram illustrating an example group interest profile application and its software components.

Referring now to FIG. 3, like reference numerals have been used to reference like components with the same or similar functionality that has been described above with reference to FIGS. 1 and 2. Since those components have been described above that description is not repeated here. An implementation of the group interest profile application 106, indicated in FIG. 3 by reference numeral 300, includes various applications or engines that are programmed to perform the functionalities described here. The profile management module 301 manages a user's (one or more users) individual profile information including the user's "interest" profile. The permission module 303 obtains permission to obtain user information on users and other information relevant to user interest profiles and/or content recommendations. The profile retrieving module 305 retrieves user profile information including the user interest profiles. The intersection determination module 307 determines the intersections (one or more) between one or more user interest profiles. The group interest profile module 309 generates a group interest profile based in part on the one or more user interest profiles. The content recommendation module 311 generates content recommendations based on the group interest profile. The selection prompt module 313 generates a user prompt for receiving content recommendations from one or more users. The scoring module 315 calculates a specific score for a recommendation of content based in part on determining a relevancy factor (for example, how relevant particular content may be to a particular user) of the one or more user interest profiles. The user interface module 317 generates a user interface for providing displays of user interest profiles or recommendations of content or both.

The group interest profile applications 106a and 106c include applications or engines that communicate over the software communication mechanism 320. Software communication mechanism 320 may be an object bus (such as CORBA), direct socket communication (such as TCP/IP sockets) among software modules, remote procedure calls, UDP broadcasts and receipts, HTTP connections, function or procedure calls, etc. Further, any or all of the communication could be secure (SSH, HTTPS, etc.). The software communication may be implemented on any underlying hardware, such as a network, the Internet, a bus 220 (FIG. 2), a combination thereof, etc.

The profile management module 301 manages a user's individual profile information including the user's interest profile. In some implementations, the profile management module 301 may either add, delete, or modify (or perform more than one or all of these tasks) information relating to a user profile (e.g., name, birthdate, occupation, employer, education, gender, email, phone number, street address, posts, photos, videos, etc.).

The permission module 303 obtains permission for obtaining user information on users and other information relevant to user interest profiles and/or recommendations of content. The permission module 303 makes certain that the user device is compliant with protocols and any privacy concerns and that any information that is obtained from a user is only after the user is provided notice and/or user consent is obtained.

The profile retrieving module 305 retrieves user profile information. The profile retrieving module 305 retrieves information from one or more users interacting synchronously or asynchronously (e.g., audio chat, video chat, instant messaging, etc.) including the user's interest profile.

The intersection determination module 307 determines the intersection between one or more user interest profiles. The intersection determination module 307 retrieves one or more user's interest profiles and determines the intersections between them. In some implementations, the intersection determination module 307 determines one or more intersections based in part on similar elements in the user interest profiles. For example, one or more users may indicate that they attended the "Good Old School" and therefore, the intersection determination module 307 determines the "Good Old School" is an intersection (similar interest) among the one or more users that are illustrated. In some instances, the intersection determination module 307 determines intersections between one or more recommendations of content.

The group interest profile module 309 generates a group interest profile, based in part on, considering the one or more user interest profiles. In some implementations, the group interest profile module 309 retrieves one or more user interest profiles from the profile retrieving module 305 and the intersection information between the one or more user interest profiles from the intersection determination module 307. The group interest profile module 309 then creates a group interest profile including the intersecting information between the one or more user interest profiles.

The content recommendation module 311 generates recommendations of content based on the group interest profile. The content recommendation module 311 retrieves one or more user interest profiles from the profile retrieving module 305 and the intersection information between the one or more user interest profiles from the intersection determination module 307 and generates one or more recommendations of content based on the group interest profile and intersection information. In some implementations, the recommendations of content include any type of content that a user may be interested in or may wish to become aware of (e.g., advertisements, webpages, music, video, books, products, etc.).

The selection prompt module 313 generates a user prompt for requesting and receiving recommendations of content from one or more users. The selection prompt module 313 generates a user interface for display and one or more users may decide to share their "personal" content with a group, by an indication of either acknowledging, approving, and/or consuming content. For example, a user may indicate that he/she has attended (or will be attending) the "Good Old School" class reunion (e.g., by clicking an "Add" button—as indicated by the two "Add" buttons that are illustrated for user 125 in FIG. 10). This indication may then be shared with the group interest profile module 309 (along with any number of other indications of consumption from other users), which generates a group interest profile based on indications of the content consumed by the users. Then, the content recommendation module 311 may generate one or more content recommendations based on the group interest profile generated, to recommend content consumed by some users to other users.

The scoring module 315 calculates a score (from a range of scores) for a particular recommendation of content based in part on determining if the recommendations of content are relevant to the one or more user interest profiles by calculating a combination of scores from each of the interest profiles. The scoring module 315 receives one or more recommendations of content from the content recommendation module 311 and the scoring module 315 generates a score for the one or more recommendations of content. For example, consider a set of N users 125a, 125b, . . . 125N interacting synchronously or asynchronously (e.g., video, audio, text, etc.). Each user has a corresponding interest profile 810a, 810b, . . . 810N. Each interest profile may be independently used to generate sets of recommendations of content for each user R1, R2, . . . Rn. Each set R1 through Rn (n being the number of sets of recommendations) may then be ranked by each model 810a through 810N. This results in a matrix of scores S of size N|R|×N (N being the total number of users/models). The score for a particular item may be some function (e.g., average, max, median, etc.) of the scores assigned to it by each of the N models. In some implementations, an item may appear in multiple users' recommendation lists and in these instances, its score would increase appropriately. In some implementations, the score is based in part on determining how relevant the recommendations of content may be to the one or more users. For example, a recommendation of content may be for the "Good Old School" class reunion, which is attended by one or more users in the group designated as the "Good Old School." Therefore the "Good Old School" class reunion recommendations of content receive a higher score. Inversely, in some instances, one recommendation of content may be for deep sea fishing and it may be determined that none (or very few) of the users live close to the ocean. Therefore, a recommendation of content relating to deep sea fishing content may receive a lower score.

The user interface module 317 may generate a user interface for display of user interest profiles and/or content recommendations. For example, the user interface module 317 may generate the user interface for display of recommendations of content and user profiles including one or more of a user name, photos, videos, posts, personal information, etc. In some implementations, the user interface module 317 displays the user prompt for a user to select one or more recommendations of content. In some instances, the user interface module 317 displays the one or more user-selected recommendations of content to one or more users. In some implementations, the user interface module 317 displays the "top" scoring recommendations of content (from the scoring module 315) to one or more users.

Figure 4:
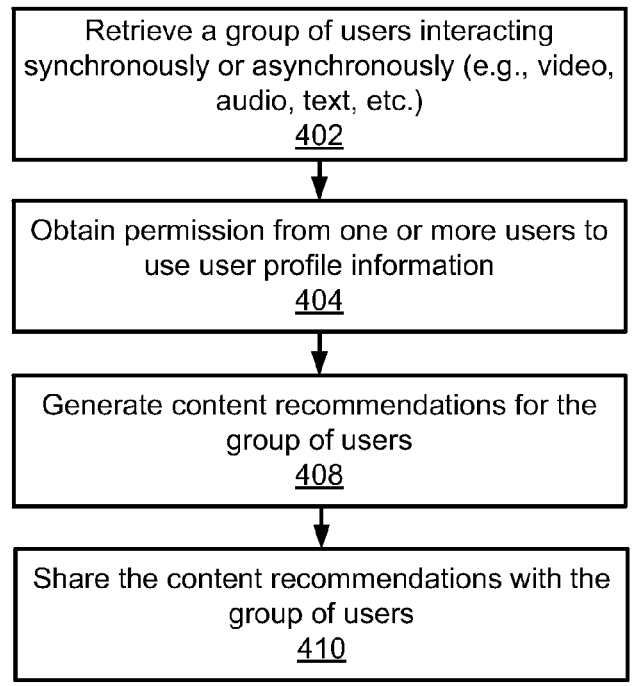
FIG. 4 is a flow chart illustrating an example method for generating recommendations on content suitable for a group.

FIG. 4 is a flow chart illustrating an example method indicated by reference numeral 400 for generating recommendations of content for a group. In the example method illustrated, one or more operations may include retrieving a group of users interacting synchronously or asynchronously (e.g., video, audio, text, etc.), as illustrated by block 402. The method 400 then proceeds to the next block 404 and may include one or more operations to obtain permission from one or more users to use their profile information. The method 400 then proceeds to the next block 406 and may include one or more operations to retrieve corresponding user interest profiles for the one or more users. The method 400 then proceeds to the next block 408 and may include one or more operations to determine intersections between user interest profiles. The method 400 then proceeds to the next block 410 and may include one or more operations to generate a group interest profile based on the intersections that are determined between the user interest profiles. From there, the method 400 then proceeds to the next block 412 and may include one or more operations to update user interest profiles based on creating the group interest profile. The method 400 then proceeds to the next block 414 and may include one or more operations to generate content recommendations based on the group interest profile.

Figure 5:
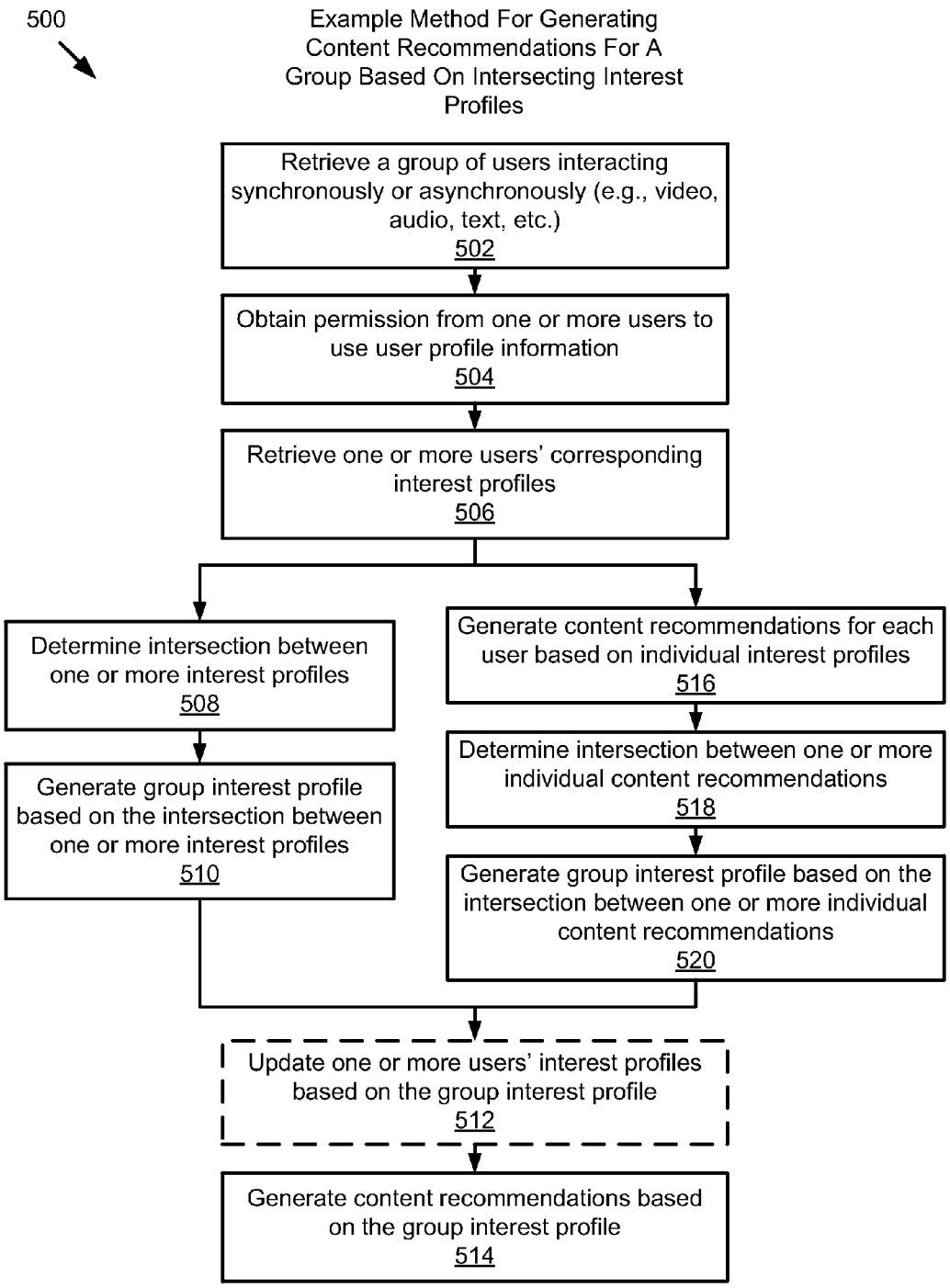
FIG. 5 is a flow chart illustrating an example method for generating recommendations of content for a group based on generating a group profile.

FIG. 5 is a flow chart illustrating an example method indicated by reference numeral 500, for generating recommendations of content for a group based on generating a group profile. In the method illustrated, operations may include retrieving a group of users who interact either synchronously or asynchronously (e.g. video, audio, text, etc.) as indicated by block 502. The method 500 then proceeds to the next block 504 and may include one or more operations to obtain permission for users to use their profile information. The method proceeds to the next block 506, at which stage, one or more operations may retrieve users' corresponding interest profiles. From that point, the method proceeds along one path, to the next block 508, at which stage, one or more operations include determining the intersections (e.g., similarities) between one or more interest profiles. The method proceeds to the next block 510, at which stage, one or more operations include generating a group interest profile, by determining an intersection between one or more interest profiles. The method proceeds to the next block 512, at which point, one or more operations of the method that are optional (as shown by broken lines around block 512) include updating one or more users' interest profiles based on the group interest profile. The method proceeds to the next block 512, at which point, one or more operations of the method include updating one or more users' interest profiles based on the group interest profile. The method proceeds to the next block 514, at which stage, one or more operations of the example method 500 include generating content recommendations based on the group interest profile. Returning to block 506, the method may proceed along another path, to the next block 516, at which point, one or more operations include generating content recommendations for individual users based on their individual interest profiles. The method then proceeds to the next block 518, at which stage, one or more operations include determining an intersection between one or more individual content recommendations. The method proceeds to the next block 520, at which stage, one or more operations include generating group interest profile based on the intersection between one or more individual content recommendations. The method then continues to the next block 512, at which point, one or more operations of the method include updating one or more users' interest profiles based on the group interest profile. The method proceeds to the next block 514, at which stage, one or more operations of the example method 500 include generating content recommendations based on the group interest profile.

Figure 6:
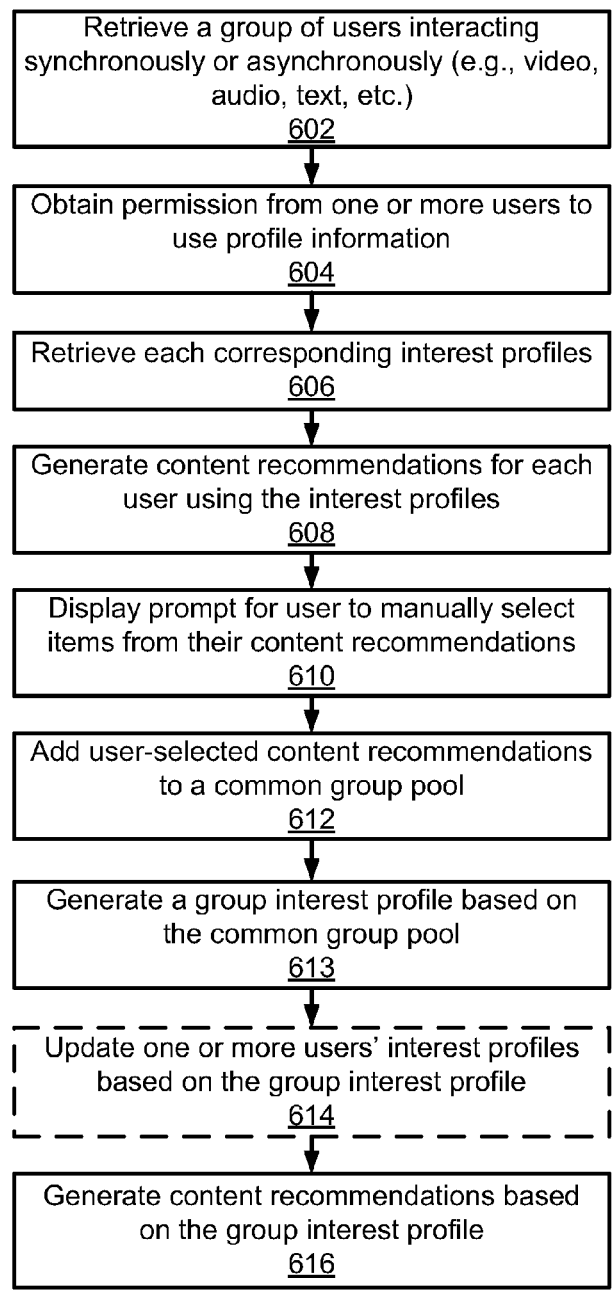
FIG. 6 is a flow chart illustrating an example method for generating recommendations based on a group shared content list.

FIG. 6 is a flow chart illustrating an example method indicated generally by reference numeral 600 for generating recommendations of content based on a group shared content list. In the example method illustrated, operations may include retrieving a group of users interacting either synchronously or asynchronously (e.g., video, audio, text, etc.), as illustrated by block 602. The example method 600 then proceeds to the next block 604 and may include one or more operations to obtain permission for users to use their profile information. The example method 600 then proceeds to the next block 606 and may include one or more operations to retrieve each corresponding user interest profile. The example method 600 then proceeds to the next block 608 and may generate recommendations of content for each user using the corresponding user interest profiles. The example method 600 then proceeds to the next block 610 and may include one or more operations to provide a display of a prompt for a user to select items from their recommendations of content. The example method 600 then proceeds to the next block 612 and may include one or more operations to add user-selected recommendations of content to a common group pool. The example method 600 then proceeds to the next block 613 and may include one or more operations to generate a group interest profile based on the common group pool. The example method 600 then proceeds to the next block 614 and may include one or more operations that are optional (as shown by broken lines around block 614) to update each user's interest profile based on the group interest profile. The example method 600 proceeds to the next block 616 and may include one or more operations to generate the content recommendations based on the group interest profile.

Figure 7:
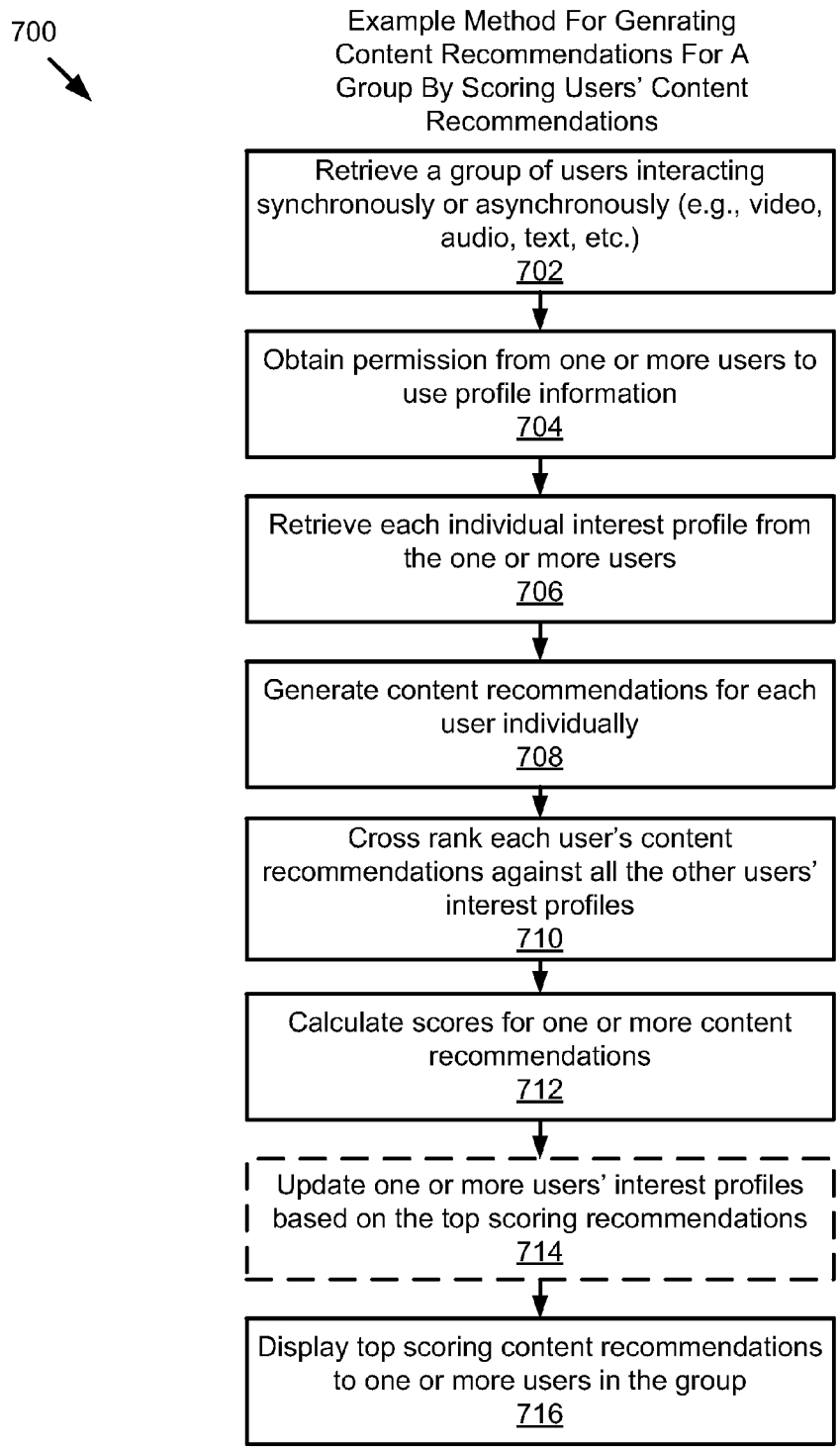
FIG. 7 is a flow chart illustrating an example method for generating recommendations of content for a group by scoring users' content recommendations.

FIG. 7 is a flow chart illustrating an example method indicated by reference numeral 700 for scoring users' recommendations of content. In the method illustrated, operations may include retrieving a group of users interacting either synchronously or asynchronously (e.g., video, audio, text, etc.) with one another, as illustrated by block 702. The example method 700 then proceeds to the next block 704, at which stage, the example method may include one or more operations to obtain permissions from users to use their profile information. The example method 700 then proceeds to the next block 706, at which stage, it may include one or more operations for retrieving corresponding user interest profile for those users from which they have obtained permissions. The example method 700 then proceeds to the next block 708 and may include one or more operations to generate recommendations of content for each user individually. The example method 700 then proceeds to the next block 710 and may include one or more operations to cross rank each user's content recommendations against all the other user's interest profiles. The example method 700 then proceeds to the next block 712 and may include one or more operations to calculate scores (from a range) for recommendations of content based on a combination of the scores from each of the interest profiles. The example method 700 then proceeds to the next block 714, at which stage, it may include one or more operations that are optional (as shown by broken lines around block 714) to update a user's interest profile, based on the "top" scoring recommendations of content. The example method 700 then proceeds to the next block 716 and may include one or more operations to provide displays of "top" scoring content recommendations to all users in the group.

Figure 8:
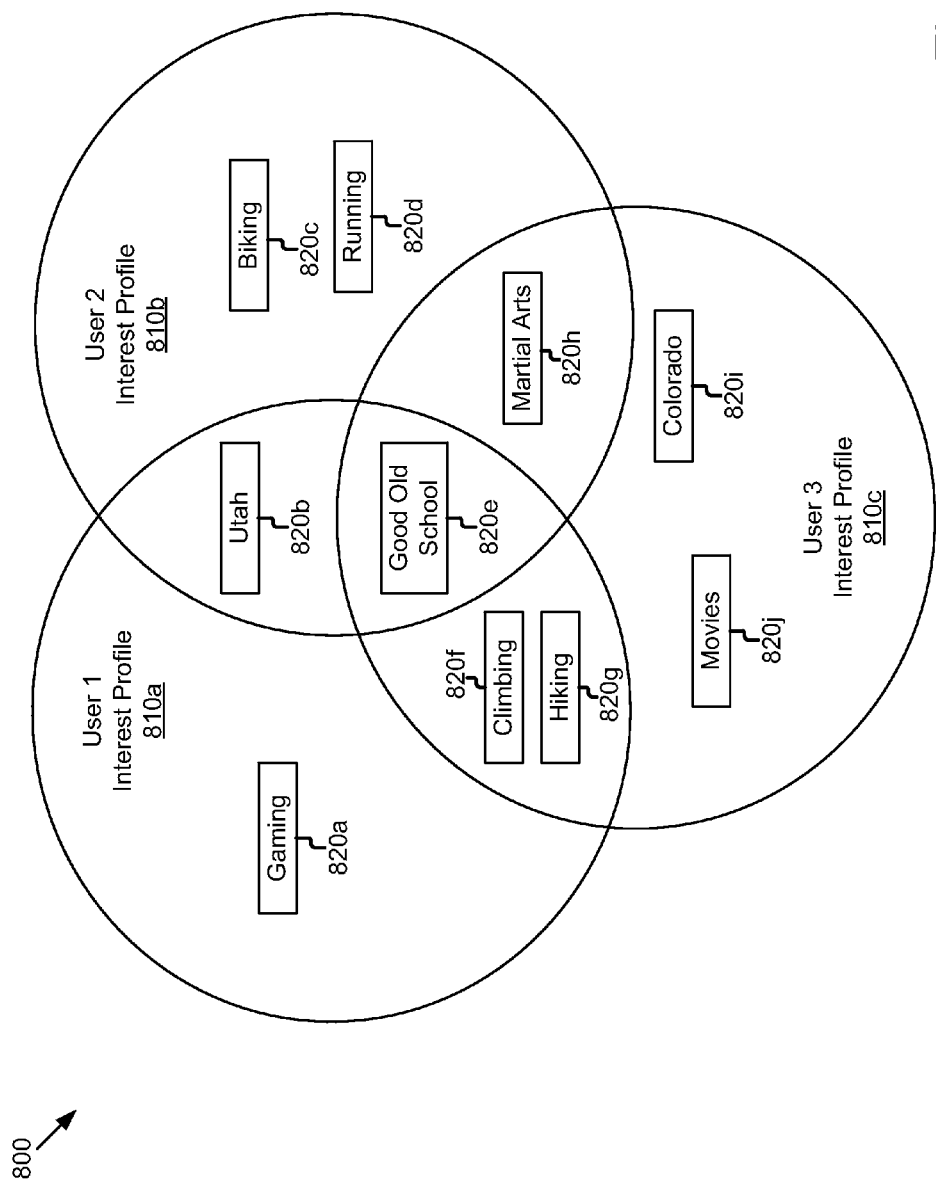
FIG. 8 is a block diagram illustrating an example representation of intersecting user interest profiles.

FIG. 8 illustrates some instances of intersecting user interest profiles. In FIG. 8, there are three particular examples of intersecting user interest profiles. As one example, an interest profile for a particular user, "User 1" (indicated by reference numeral 810a), includes a plurality of interests, for example, a gaming interest (indicated by reference numeral 820a), an interest in the state of Utah (indicated by reference numeral 820b), an interest in a "Good Old School," indicated by reference numeral 820e, an interest in climbing, indicated by reference numeral 820f, and an interest in hiking, indicated by reference numeral 820g. As another example, an interest profile for another particular user, "User 2" (indicated by reference numeral 810b), includes a plurality of diverse interests, for example, an interest in the state of Utah indicated by reference numeral 820b, an interest in a "Good Old School," indicated by reference numeral 820e, an interest in biking, indicated by reference numeral 820c, an interest in running, as indicated by reference numeral 820d, and an interest in martial arts, as indicated by reference numeral 820h. As yet another example, an interest profile for another particular user, "User 3" (indicated by reference numeral 710c), may include an interest in a "Good Old School" indicated by reference numeral 820e, an interest in martial arts, indicated by reference numeral 820h, an interest in climbing, as indicated by reference numeral 820f, an interest in hiking, as indicated by reference numeral 820g, an interest in movies, as indicated by reference numeral 820j, and an interest in the state of Colorado, as indicated by the reference numeral 820h.

There is an intersection of interests between users "User 1" and "User 2." Both users share an interest in the state of "Utah." The shared interest in "Utah," indicated by reference numeral 820b, lies in the intersection between the interest profile for "User 1" (810a) and the interest profile (810b) for "User 2." The interest in martial arts indicated by reference numeral 820h falls within an intersection between the interest profile (810b) for "User 2" and the interest profile (810c) for "User 3." The interest in climbing (8200 and the interest in hiking (820g) lie within the intersection between the interest profiles of "User 1" (810a) and "User 3" (810c.) The interest in "Good Old School" (820e) falls within an intersection between the interest profiles of "User 1" (810a) and "User 2" (810b) and the interest profile of "User 3" (810c).

Figure 9:
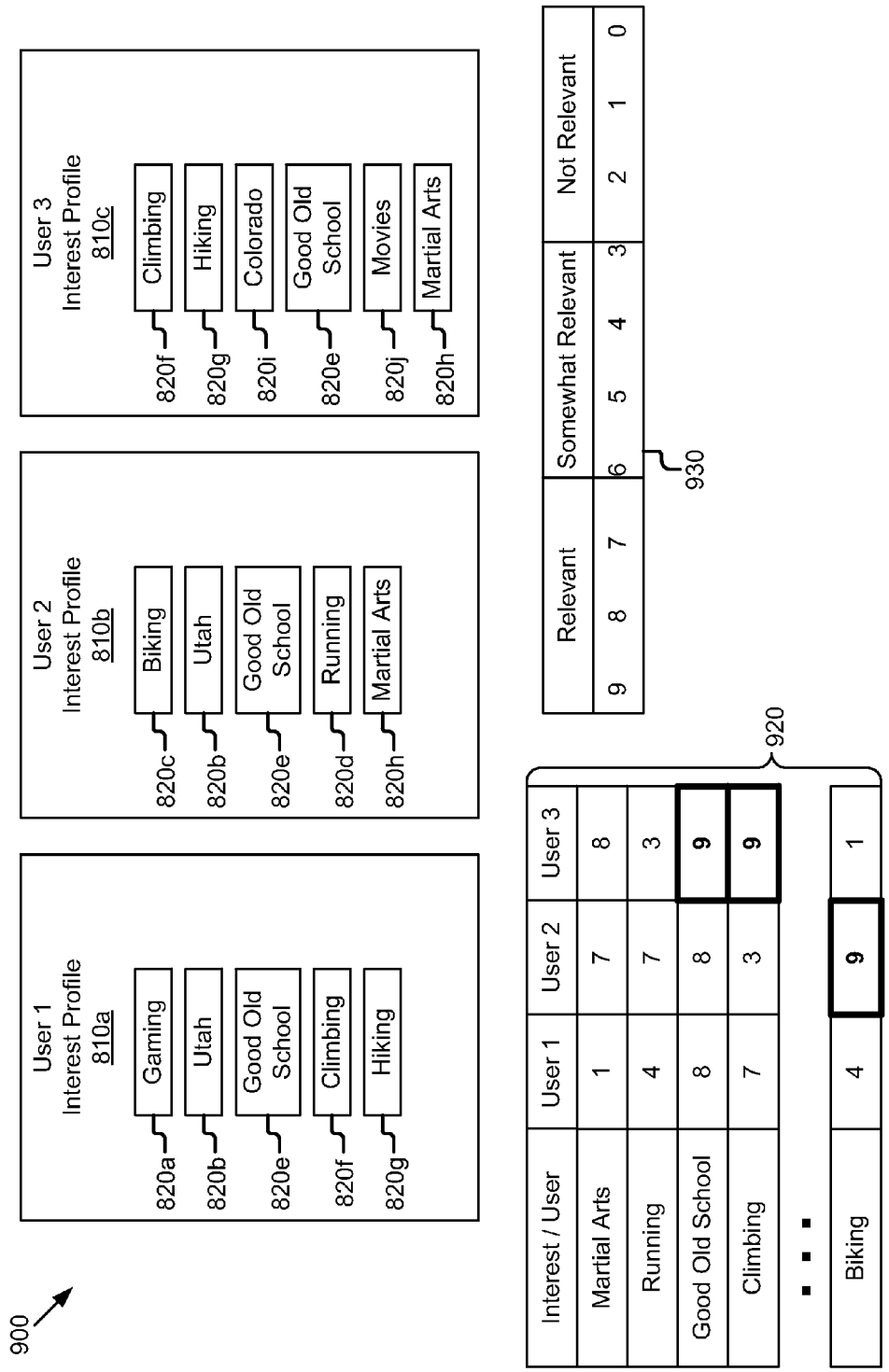
FIG. 9 is a block diagram illustrating an example representation of scoring intersecting interest profiles.

FIG. 9 illustrates some instances of user interest profiles and some examples of their corresponding scores. FIG. 9, illustrates the interest profile for "User 1," indicated by reference numeral 810a, the interest profile for "User 2," indicated by reference numeral 810b, and the interest profile for "User 3," indicated by reference numeral 810b. Each of the user interest profiles in FIG. 9 may be similar to those illustrated in FIG. 8. As the user interest profiles and intersections have been described above, that description is not repeated here. FIG. 9 also illustrates an example scoring table 920. The scoring table 920 illustrates one example of scoring of interests of users. For example, one or more interests that are determined to be within a user's interest profile may be assigned a higher score than interests that are not within a user's profile (e.g., running is designated a higher score for "User 2" than for "User 1" or for "User 3"). In another example, the "Good Old School" recommendation is assigned higher scores for each of the users "User 1," "User 2," and "User 3," in the scoring table 920 because the interest profile for "User 1" (810a), the profile interest for "User 2" (810b), the interest profile for "User 3" (810c) all include the "Good Old School" interest 820e. FIG. 9 also illustrates one example of a scoring guide 930. In this example, the scoring guide 930 illustrates a scale of scores ranging from 0 to 9—where scores of 9-7 indicate recommendations of content that are determined to be "relevant" to a particular user, scores of 6-3 for recommendations of content that are determined to be "somewhat relevant" to a particular user, and scores of 2-0 for recommendations of content that are determined to be "not relevant" to a particular user.

Figure 10:
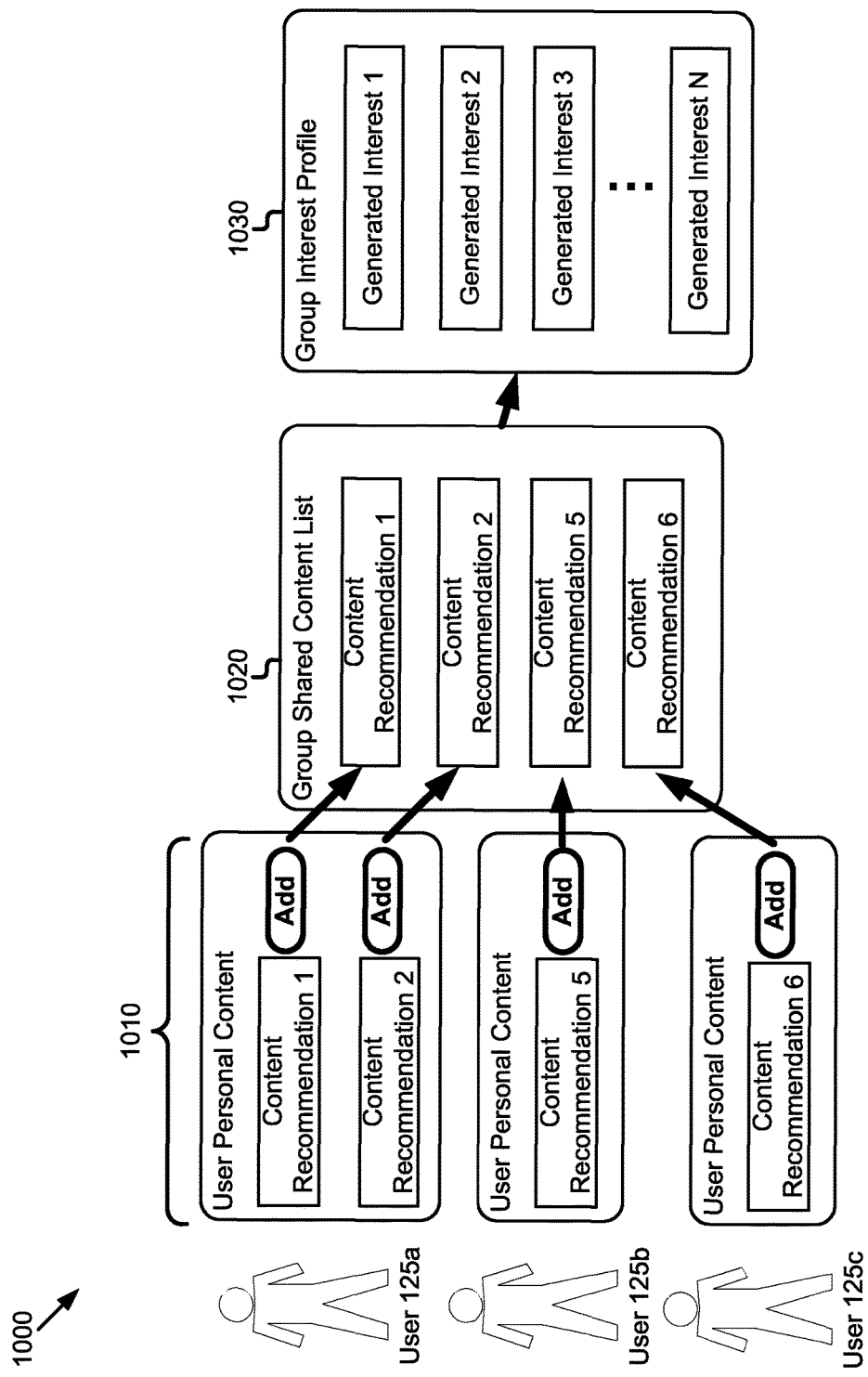
FIG. 10 is a graphical representation of an example user interface for adding personal recommendations to a common group pool of recommendations.

FIG. 10 illustrates some implementations of a graphical user interface for sharing personal recommendations with a group shared content list. FIG. 10 illustrates user personal content 1010, a group shared content list 1020, and a group interest profile 1030. The user personal content 1010 includes one or more recommendations of content that is personalized for one or more users. Each individual user (e.g., user 125a, user 125b, and user 125c) may select an "add" button, and add that particular recommendation to the group shared content list 1020. The group shared content list 1020 includes the one or more recommendations of content shared by one or more users and are sent to the group interest profile module 309 to determine a group interest profile 1030 based on the group shared content list 1020.

The foregoing description of the implementations of the present technology has been presented for the purposes of illustration and description. It is not intended to be exhaustive or to limit the present technology to the precise form disclosed. Many modifications and variations are possible in light of the above teaching. It is intended that the scope of the present technology be limited not by this detailed description, but rather by the claims of this application. As should be understood by those familiar with the art, the present technology may be implemented in other specific forms, without departing from the spirit or essential characteristics thereof. Likewise, the particular naming and division of the modules, routines, features, attributes, methodologies, and other aspects are not mandatory or significant, and the mechanisms that implement the present disclosure or its features may have different names, divisions and/or formats. Furthermore, as should be apparent to one of ordinary skill in the relevant art, the modules, routines, features, attributes, methodologies, and other aspects of the present technology can be implemented as software, hardware, firmware, or any combination of the three. Also, wherever a component, an example of which is a module, of the present technology is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present technology is in no way limited to implementation in any specific programming language, or for any specific operating system or environment. Accordingly, the disclosure of the present technology is intended to be illustrative, but not limiting, of the scope of the present disclosure, which is set forth in the following claims.

What is claimed is:

1. A computer-implemented method comprising:
    retrieving, by one or more computing devices, a first user interest profile of a first user and a second user interest profile of a second user from a social network;
    generating, by at least one of the one or more computing devices, a first set of recommendations of content for the first user based on the first user interest profile and a second set of recommendations of content for the second user based on the second user interest profile;
    determining, by at least one of the one or more computing devices, a first intersection between the first set of recommendations of content for the first user and the second set of recommendations of content for the second user;
    identifying, by at least one of the one or more computing devices, a shared set of recommendations of content from the first intersection between the first set of recommendations of content for the first user and the second set of recommendations of content for the second user;
    generating, by at least one of the one or more computing devices, a first shared interest element for a group of the first user and the second user based on the shared set of recommendations of content;
    generating, by at least one of the one or more computing devices, a group interest profile for the group of the first user and the second user based on the first shared interest element; and
    generating, by at least one of the one or more computing devices, a third set of recommendations of content for the group of the first user and the second user based on the group interest profile.

2. A computer-implemented method according to claim 1, wherein the first user interest profile corresponds to the first user in the group and the second user interest profile corresponds to the second user in the group on the social network.

3. A computer-implemented method according to claim 1, further comprising:
    determining a second intersection between the first user interest profile and the second user interest profile to identify a second shared interest element.

4. A computer-implemented method according to claim 3, wherein the group interest profile is based at least in part on the second intersection identifying a presence of the second shared interest element between the first user interest profile and the second user interest profile.

5. A computer-implemented method according to claim 1, further comprising:

receiving, from the first user, a selection of a first recommendation of content in the first set of recommendations of content; and receiving, from the second user, a selection of a second recommendation of content in the second set of recommendations of content.

6. A computer-implemented method of claim 5, further comprising:

adding the first recommendation of content and the second recommendation of content to a pool of recommendations.

7. A computer-implemented method according to claim 6, wherein generating the group interest profile includes generating the group interest profile based on the pool of recommendations.

8. A computer-implemented method according to claim 1, wherein generating the third set of recommendations of content for the group further comprises:

calculating a score for the first set and the second set of recommendations of content based on a corresponding relevancy of the first set of recommendations of content to the first user interest profile and the second set of recommendations of content to the second user interest profile;

determining a statistical function of calculated scores being assigned to the first set and the second set of recommendations of content;

calculating a final score for the first set and the second set of recommendations of content based on a value of the determined statistical function of the calculated scores; and providing for display top scoring recommendations of content to the group of users based on the final score calculated for the first set and the second set of recommendations of content.

9. A computer-implemented method according to claim 8, wherein the statistical function is one from a group of an average function, a mean function and a median function.

10. A computer-implemented method according to claim 8, further comprising:

updating the first user interest profile and the second user interest profile based on the top scoring recommendations of content.

11. A computer program product comprising a non-transitory computer useable memory including a computer readable program, wherein the computer readable program when executed on a computer causes the computer to:

retrieve a first user interest profile of a first user and a second user interest profile of a second user from a social network;

generate a first set of recommendations of content for the first user based on the first user interest profile and a second set of recommendations of content for the second user based on the second user interest profile;

determine a first intersection between the first set of recommendations of content for the first user and the second set of recommendations of content for the second user;

identify a shared set of recommendations of content from the first intersection between the first set of recommendations of content for the first user and the second set of recommendations of content for the second user;

generate a first shared interest element for a group of the first user and the second user based on the shared set of recommendations of content;

generate a group interest profile for the group of the first user and the second user based on the first shared interest element; and generate a third set of recommendations of content for the group of the first user and the second user based on the group interest profile.

12. A computer program product according to claim 11, wherein the first user interest profile corresponds to the first user in the group and the second user interest profile corresponds to the second user in the group on the social network.

13. A computer program product according to claim 11, further causing the computer to determine a second intersection between the first user interest profile and the second user interest profile to identify a second shared interest element.

14. A computer program product according to claim 13, wherein the group interest profile is based at least in part on, the second intersection identifying a presence of the second shared interest element between the first user interest profile and the second user interest profile.

15. A computer program product according to claim 11, further causing the computer to receive, from the first user, a selection of a first recommendation of content in the first set of recommendations of content and receive, from the second user, a selection of a second recommendation of content in the second set of recommendations of content.

16. A computer program product according to claim 15, further causing the computer to add the first recommendation of content and the second recommendation of content to a pool of recommendations.

17. A computer program product according to claim 16, wherein generating the group interest profile includes generating the group interest profile based on the pool of recommendations.

18. A computer program product according to claim 11, wherein causing the computer to generate the third set of recommendations of content for the group further comprises causing the computer to calculate a score for the first set and the second set of recommendations of content based on a corresponding relevancy of the first set of recommendations of content to the first user interest profile and the second set of recommendations of content to the second user interest profile, to determine a statistical function of calculated scores being assigned to the first set and the second set of recommendations of content, to calculate a final score for the first set and the second set of recommendations of content based on a value of the determined statistical function of the calculated scores and to provide for display top scoring recommendations of content to the group of users based on the final score calculated for the first set and the second set of recommendations of content.

19. A computer program product according to claim 18, wherein the statistical function is one from a group of an average function, a mean function and a median function.

20. A computer program product according to claim 18, further causing the computer to update the first user interest profile and the second user interest profile based on the top scoring recommendations of content.

21. A system, comprising:

a processor;

a memory storing instructions, that when executed, cause the system to:

retrieve a first user interest profile of a first user and a second user interest profile of a second user from a social network;

generate a first set of recommendations of content for the first user based on the first user interest profile and a second set of recommendations of content for the second user based on the second user interest profile;

determine a first intersection between the first set of recommendations of content for the first user and the second set of recommendations of content for the second user;

identify a shared set of recommendations of content from the first intersection between the first set of recommendations of content for the first user and the second set of recommendations of content for the second user;

generate a first shared interest element for a group of the first user and the second user based on the shared set of recommendations of content;

generate a group interest profile for the group of the first user and the second user based on the first shared interest element; and generate a third set of recommendations of content for the group of the first user and the second user based on the group interest profile.

22. A system according to claim 21, wherein the first user interest profile corresponds to the first user in the group and the second user interest profile corresponds to the second user in the group on the social network.

23. A system according to claim 21, further comprising determining a second intersection between the first user interest profile and the second user interest profile to identify a second shared interest element.

24. A system according to claim 23, wherein the group interest profile is based at least in part on the second intersection identifying a presence of the second shared interest element between the first user interest profile and the second user interest profile.

25. A system according to claim 21, further comprising:
a user interface configured to receive, from the first user, a selection of a first recommendation of content in the first set of recommendations of content and receive, from the second user, a selection of a second recommendation of content in the second set of recommendations of content.

26. A system according to claim 25, further comprising:
a selection prompt module for adding the first recommendation of content and the second recommendation of content to a pool of recommendations.

27. A system according to claim 26, wherein a group interest profile module generates the group interest profile based on the pool of recommendations.

28. A system according to claim 21, wherein generating the third set of recommendations of content for the group further comprises calculating a score for the first set and the second set of recommendations of content based on a corresponding relevancy of the first set of recommendations of content to the first user interest profile and the second set of recommendations of content to the second user interest profile, determining a statistical function of calculated scores being assigned to the first set and the second set of recommendations of content, calculating a final score for the first set and the second set of recommendations of content based on a value of the determined statistical function of the calculated scores and providing for display top scoring recommendations of content to the group of users based on the final score calculated for the first set and the second set of recommendations of content.

29. A system according to claim 28, wherein the statistical function is one from a group of an average function, a mean function and a median function.

30. A system according to claim 28, further comprising updating the first user interest profile and the second user interest profile based on the top scoring recommendations of content.

* * * * *